United States Patent [19]

Mears et al.

[11] Patent Number: 4,955,025
[45] Date of Patent: Sep. 4, 1990

[54] FIBRE-OPTIC LASERS AND AMPLIFIERS

[76] Inventors: Robert J. Mears, 34 Thorold Road, Bitterne Park, Southampton, Hampshire SO2 4JB; Laurence Reekie, 117 Oaktree Road, Bitterne Park, Southampton, Hampshire SO2 4PJ; Simon B. Poole, 18 Union Road, Northam, Southampton, Hampshire SO2 OPU; David N. Payne, 12 Redcroft Lane, Lowford, Bursledon, Southampton, Hampshire SO2 5NH, all of England

[21] Appl. No.: 326,458

[22] Filed: Mar. 20, 1989

Related U.S. Application Data

[63] Continuation of Ser. No. 211,093, Jun. 10, 1988, abandoned, which is a continuation of Ser. No. 56,997, Apr. 9, 1987, abandoned.

[30] Foreign Application Priority Data

Aug. 13, 1985 [GB] United Kingdom ............... 8520300
Aug. 13, 1985 [GB] United Kingdom ............... 8520301

[51] Int. Cl.⁵ .................................................. H01S 3/30
[52] U.S. Cl. ......................................................... 372/6
[58] Field of Search ...................... 372/6, 94, 108, 71, 372/75, 13, 20, 68

[56] References Cited

U.S. PATENT DOCUMENTS

| | | | |
|---|---|---|---|
| 3,705,992 | 12/1972 | Ippen et al. | 372/20 |
| 3,729,690 | 4/1973 | Snitzer | 331/94.5 |
| 4,044,315 | 8/1977 | Snitzer | 331/94.5 F |
| 4,063,106 | 12/1977 | Ashkin et al. | 372/6 |
| 4,136,929 | 1/1979 | Suzaki | 372/6 |
| 4,674,830 | 6/1987 | Shaw et al. | 372/6 |
| 4,723,824 | 2/1988 | Shaw et al. | 372/6 |
| 4,731,787 | 3/1988 | Fan et al. | 372/71 |
| 4,756,003 | 7/1988 | Baer et al. | 372/13 |

FOREIGN PATENT DOCUMENTS

| | | |
|---|---|---|
| 0136871 | 9/1984 | European Pat. Off. |
| 0139436 | 5/1985 | European Pat. Off. |
| 0146262 | 6/1985 | European Pat. Off. |
| 0179320 | 4/1986 | European Pat. Off. |
| 0175477 | 9/1985 | Japan .................... 372/6 |
| 1015057 | 12/1965 | United Kingdom . |
| 1263628 | 2/1972 | United Kingdom . |

OTHER PUBLICATIONS

Stone et al., "Neodymium-Doped . . . Geometry", Appl. Phys. Lett., vol. 23, No. 7, Oct. 1, 1973, pp. 388-389.
Stone et al., "Neodymium-Doped . . . Pump", Applied Optics, vol. 13, No. 6, Jun. 1974, pp. 1256-1258.
Labudde et al., "Bandwidth Reduction . . . Raman Lasers", IEEE J. of Quan. Elec., vol. QE-16, No. 2, Feb. 1980, pp. 115-117.

Primary Examiner—Frank Gonzalez
Attorney, Agent, or Firm—Cushman, Darby & Cushman

[57] ABSTRACT

An active device (FIG. 1) comprising a length of doped fiber (1) and an end-coupled pump source (11). The fiber (1) is of single-mode geometry and incorporates rare-earth or transition metal dopant ions. These latter are incorporated at a low-level uniform concentration ($\leq 900$ ppm). The fiber host (1) selected exhibits an inherently ultra low attenuation loss ($\leq 40$ dB/km) at the emission wavelength. The fibers (1) are generally of long length (e.g. 5 m to 300 m) and may be coiled for compact packaging. The fiber (1) may be formed as part of a Fabry-Perot cavity (1, 7, 9); or, as a ring cavity (FIG. 8) using a doped fiber coupler (29) spliced to form a ring (27). Q-switch and mode-locking devices (19) and gratings (25) may be included as part of the Fabry-Perot cavity to allow pulse-mode operation and/or wavelength tuning, respectively. The fiber (1) may also be utilised as an amplifier.

6 Claims, 4 Drawing Sheets

FIBRE-OPTIC LASERS AND AMPLIFIERS

This is a continuation of application Ser. No. 211,093, filed June 10, 1988, which was abandoned upon the filing hereof, which is a continuation of application Ser. No. 056,997, filed Apr. 9, 1987, now abandoned.

TECHNICAL FIELD

This invention concerns improvements in or relating to fibre-optic lasers and amplifiers, these being active devices of the type in which useful gain is afforded by the stimulated emission of radiation. These devices comprise: a length of fibre, in which is incorporated a distribution of active dopant ions; and, an optical-pumping source coupled to the fibre.

Hybrid semiconductor-diode and optical fibre technologies are both well advanced. However, full integration of the components of these technologies has yet to be achieved. There is a need for active devices that would be readily compatible with single-mode fibre systems and that accordingly could bridge these technologies.

BACKGROUND ART

Details of multimode fibre-geometry lasers were published in the early part of the last decade (1973). By way of background, the interested reader is referred to the following articles by J.Stone and C.A.Burrus: "Neodymium — doped silica lasers in end-pumped fibre geometry", Appl Phys Lett 23 pp 388–389 (October 1973); "Neodymium — Doped Fibre Lasers: Room Temperature cw Operation with an Injection Laser Pump", Appl Optics 13 pp 1256–1258 (June 1974). The laser described comprised stub lengths of fibre (about 1 cm length) with core diameters ranging from 800 to 15 microns. Continuous (cw) lasing action was demonstrated using an end-coupled gallium arsenide (GaAs) injection laser as optical pumping source.

Notwithstanding considerable advances made in single-mode fibre technology, and the passage of more than a decade since that time, until now no fibre-laser fully compatible with single-mode fibre systems has been developed.

DISCLOSURE OF THE INVENTION

The present invention is intended to meet the need aforesaid, and to provide a fibre-laser or amplifier capable of single-mode operation and compatible with single-mode fibre systems.

In accordance with the invention thus there is provided a fibre-optic laser or amplifier, an active device of the type in which gain is provided by the stimulated emission of radiation, this device comprising:

a length of cladded glass fibre incorporating active dopant ions; and, an optical pump source coupled thereto; wherein the device is characterized in that:

the fibre is of single-mode geometry and capable thus of sustaining single transverse mode propagation at the emission wavelength; and, the active dopant ions, ions of rare-earth or transition metal, are incorporated in the fibre at a low-level uniform concentration, the fibre providing an ultra low loss host therefor.

It is convenient to use as the fibre of single-mode geometry, a fibre having a step-index profile. Other types of single mode fibre, however, are not precluded from the scope of this invention and may have the form of polarisation maintaining fibres, polarising fibres dispersion-shifted fibres and helical-core fibres. Dopants may be incorporated in the fibre core, in the fibre cladding or in both. More than one dopant species may be incorporated to extend device versatility.

Moreover, many passive fibre devices could be used, in conjunction with the active device, to provide spectral control or temporal switching:

1. Gratings deposited on to the fibre after the field has been exposed by removing the fibre cladding by chemical or mechanical means. Spectral-line narrowing of the laser can thus be obtained;

2. Acousto-optic modulation of the fibre laser either longitudinally or transversely using piezo-electric materials or acoustic-waves. Switching and modulation can thus be achieved, including cavity Q-switching and mode-locking; and, p3. Fibre polarisers, either exposed field devices or using single-polarisation fibre which can be used to control the output polarisation state.

By using a new manufacturing process (S.B. Poole et al "Fabrication of low-loss optical containing rare-earth ions", Electron Lett 21 pp 737–738 (1985) it is possible now to fabricate single-mode fibres with uniform low dopant concentrations up to 900 ppm, whilst maintaining the low-losses which are characteristic of modern telecommunications fibres (i.e. $\lesssim$ 40 dB/km and typically ~1/dB/km). These fibres are fully compatible with existing fibre devices such as fused couplers, polarisers, filters and phase modulators, (eg to achieve single polarisation operation, wavelength selection, mode locking and Q-switching), and consequently it is possible to envisage a new all-fibre laser/amplifier technology.

Single-mode fibre lasers and amplifiers, as considered herein, possess a number of advantages over their bulk counterparts. By virtue of their small cores (typically 8 $\mu$m diameter and less), very-low thresholds (~100$\mu$W) and high gains can be achieved. Also since typically fibre diameters overall are about 100 $\mu$m, thermal effects prove to be minimal.

As a result of these attributes, useful laser action or amplifier gain can be produced for less commonplace rare-earth transition metal dopants and for less commonplace optical transitions, even where the optical transitions involved are inherently weak. Room temperature continuous laser operation has even been found possible for 3-level laser systems which have previously only operated in a pulsed mode.

Since the dopant concentration is so low, manufacture can be economical. A typical device might use as little as 0.1 $\mu$g of dopant oxide.

Although impliedly, at the lowest dopant concentrations lasers and amplifiers, as considered herein, incorporate fibres of a relatively long length, e.g. 5 cm and greater up to at least 300 m, (the length of the fibre serves as a cladding mode filter and gain is distributed), compact devices can be produced. A coiled 1 m length fibre laser can be readily fitted into a 1 cm$^3$ enclosure.

Silica, if selected as the fibre host medium, has good power handling characteristics. Moreover in the presence of a high silica glass host, the optical transitions of the rare-earth or transition metal dopant ions are substantially broadened. This, as detailed below allows the realisation of both tunable lasers and broad-band amplifiers.

Most rare-earth dopants and some transition metal dopants have now been investigated experimentally.

Remarkably, all exhibit windows in which losses are low notwithstanding the close proximity of high-loss absorption bands. This enables the construction of extremely long amplifiers and lasers. A 300 m length laser has now been proven under test.

In summary, the active devices considered herein provide improved sources/amplifiers for telecommunications applications because they can handle high powers without damage, they provide smaller/lighter/cheaper general purpose active devices and may in conjunction with other fibre devices (eg gratings) provide new and powerful signal processing functions. Note also that non-linear effects can be readily achieved at the optical power levels obtained in fibre lasers, affording exploitation of a number of simultaneous laser and non-linear effects.

BRIEF INTRODUCTION OF THE DRAWINGS

In the drawings accompanying this specification:

FIG. 1, is a plan-schematic illustrating an experimental arrangement for a diode-pumped fibre FabryPerot cavity laser; FIG. 2 is a graph depicting output power as a function of pump power, measured for the laser of the preceding figure; FIG. 3 is a plan-schematic illustration of a Q-switched cavity laser, a variant of the laser of figure preceding; FIG. 4 is a plan-schematic illustration of a tunable cavity laser, a variant of the lasers of figures and 3; FIG. 5 is a graph depicting absorption spectra for neodymium-, erbium - and terbium - doped silica fibre; FIGS. 6 and 7 are graphs showing emission spectra for erbium and for praseodymium - doped fibres, these showing the tuning response of lasers including these fibres; FIG. 8 is a plan-schematic illustrating an experimental arrangement for a dye-laser pumped fibre ring-cavity laser; FIG. 9 is a graph depicting the output spectrum of the ring-cavity laser shown in the preceding figure; and, FIG. 10 is a plan-schematic illustrating a doped-fibre amplifier.

DESCRIPTION OF EMBODIMENTS

Figure 1:
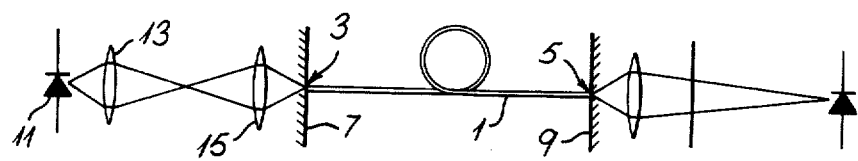

So that this invention may be better understood, embodiments thereof will now be described and reference will be made to the accompanying drawings. The description that follows is given by way of example only.

Referring now to the drawings, a single-mode geometry step-index profile fibre with a germania/silica core doped with 300 ppm of $Nd^{3+}$, cut off wavelength of 1 $\mu$m and an index difference of 1%, was fabricated using the method described in our earlier filed patent application Ser. No. 8520300 dated 13 Aug 1985, published details of which appear in the article "Fabrication of low-loss optical fibres containing rare-earth ions"mentioned hereinbefore. In summary, high-purity hydrated neodymium trichloride is used as dopant source during a modified chemical vapour deposition (MCVD) process. The trichloride is first dehydrated in the presence of a chlorine dying gas and fused to the walls of a carrier chamber. Cladding glass material such as $SiO_2$ - $B_2O_3$ is deposited on the inside wall of a heated silica tube in conventional manner. Thereafter the carrier chamber is preheated to above 1000 ° C. to obtain a desired vapour pressure. During core deposition the reactants (typically $GeCl_4$ and $SiCl_4$) are mixed with oxygen and passed through the heated dopant chamber where controlled amounts of the rare-earth halide are entrained in the gas flow. The temperature of the MCVD hot zone is chosen such that it is not hot enough to fuse the deposited core-glass layers. This essential feature enables further drying of the materials prior to fusion. This latter drying step is performed by prolonged heating at 900° C. or so in the presence of e.g. a chlorine gas flow. The unsintered layer is then fused to form a glassy layer, the preform collapsed and a fibre drawn to the described geometry.

A fibre 1 having a length of 2 m and an absorption of 5 dB/m at the pump wavelength of 820 nm was chosen. The loss at the lasing wavelength (1.088 $\mu$m) for this fibre was less than 4 dB/km. FIG. 1 shows the experimental configuration. The fibre ends 3, 5 were cleaved and directly butted to dielectric mirrors 7, 9 having a high reflectivity (~99.5%) at the lasing wavelength and high transmittance (~80%) for the pump. In order to achieve an elevated cavity finesse it is essential to minimise the fibre end angle and thus ensure intimate contact with the mirror. A York Technology cleaving tool type No. 007 was used and the fibre ends 3, 5 inspected before index-matching to the mirrors 7, 9. Alternatively, reflective coatings, e.g. multi-layer dielectric coatings can be deposited directly onto the fibre end faces.

Pumping was by a single-mode GaA1A-s Laser 11 (Hitachi HLP 1400), which was focused by a lens arrangement 13, 15 and launched into the fibre with an efficiency of 16%. Lasing threshold was observed for a total semiconductor laser power of 600 $\mu$W. This corresponds to an estimated absorped pump-power of only 100 $\mu$W in the 2 m long fibre 1 and is an indication of the very low intracavity losses.

Figure 2:
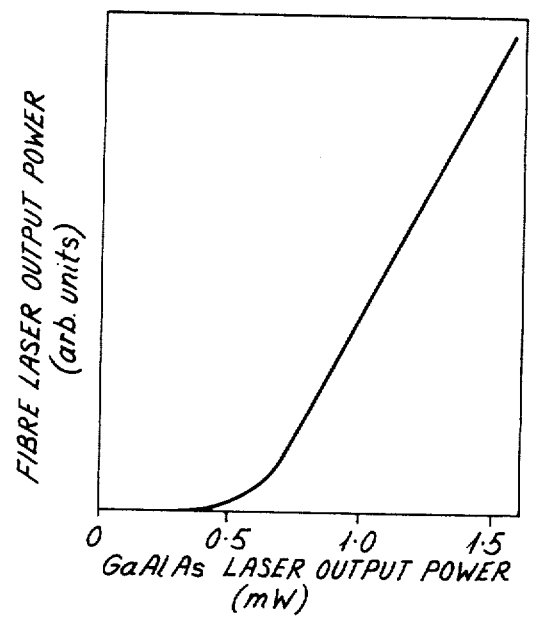

The output power as a function of pump power for the fibre laser is shown in FIG. 2. No saturation of the output was observed at pump powers up to the maximum available ( 20 mW). Operation of the laser at reduced duty cycle gave no decrease in lasing threshold, indicating that thermal effects are negligible. The fibre laser can therefore be easily operated CW without auxiliary cooling, unlike previous neodymium-doped glass lasers. Modulation of the pump produced relaxation oscillations, from which a cavity finesse of 300 was calculated.

The wavelength of operation of the fibre laser was measured to be 1.088 $\mu$m i.e. shifted by approximately 30 nm to longer wavelengths than would be expected for conventional neodymium glass lasers.

It is noted that a fibre grating may be used in place of the end mirror 9 and may be spliced to or formed in the doped fibre (1).

Figure 3:
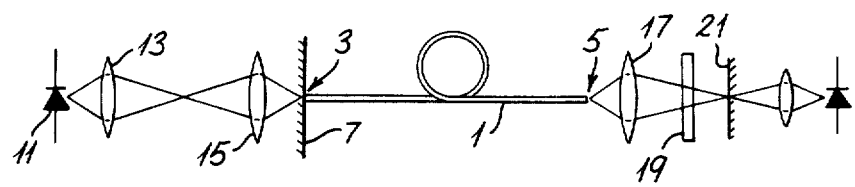

The described laser cavity may be modified to afford Q-Switching. A typical arrangement is shown in FIG. 3. Here a microscope objective 17, an acousto-optic deflector 19 and an output mirror 21 are employed in place of the abutted mirror 9 of FIG. 1. In a tested configuration, the fibre 1 used had the following characteristics: 3.5 $\mu$m core diameter, NA (numerical aperture) of 0.21, length 3.2 m and a total absorption at the pump wavelength of 97% (corresponding to 300 ppm $nd^{3+}$ content). The loss at the lasing wavelength (1.088 m) was negligable (10dB/km). The fibre ends 3, 5 were cleaved and one end 3 butted to the input dielectric mirror 7. This mirror 7 had a high transmission (T=85%) at the pump wavelength and a high reflectivity (R=99.8%) at the lasing wavelength, although lower reflectivity mirrors could be advantageously used. The pump source 11 used was as above and light was launched into the fibre with an efficiency of approximately 25%. The CW threshold was 3.7 mW absorbed. The acousto-optic deflector 19 was used in transmission mode, the high-Q state being achieved by electronically removing the applied RF with 2 μs duration pulses. The output mirror 21 used in this configuration had a transmission at the lasing wavelength of 12%. Pulse repetition rate was variable between single shot and 4 kHz with no change in peak output power or pulse duration.

A mechanical chopper with a mark-space ratio of 1:300 was substituted in the cavity to provide an alternative method of Q-switching. Using an output mirror 21 with a transmission of 65% at the lasing wavelength, output pulses of peak power greater than 300 mW and FWHM of 500 nS at a repetition rate of 400 Hz were then obtained. A saturable absorber may also be used for Q-switching and mode-locking. Possibly this could be incorporated within the fibre as an additional dopant.

Figure 4:
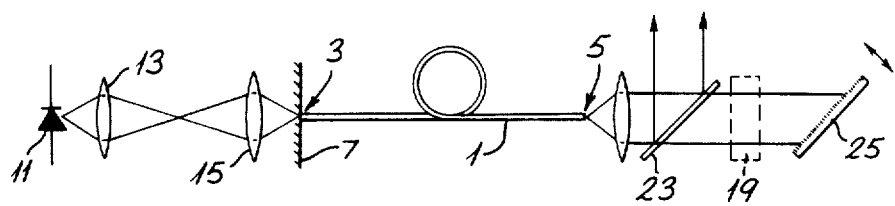

The Q-switch arrangement of FIG. 3 may be supplemented with a beam splitter 23 and a reflection grating 25 as shown in FIG. 4.

In the experimental arrangement tested, a 5 m length of $Nd^{3+}$doped fibre 1 with 15 dB/m unsaturated absorption at 514 nm was used as gain medium. An argon-ion laser was used as pump source. Optical feedback was provided with a plane input mirror 7 (R>99% @1.09 μm; T =80% @514 nm) and a diffraction grating 25 (600 lines/mm, blazed at 1 μm). An intracavity pellicle was used as the beam splitter/output coupler 23. The lasing wavelength could be selected by changing the angle of the grating 25. The laser was widely tunable, being tunable over an 80 nm region from 1065 nm to 1145 nm. Threshold occurred at 25 mW input corresponding to only 10 mW absorbed in the fibre. Pulsed and cw operation were demonstrated.

Figure 5:
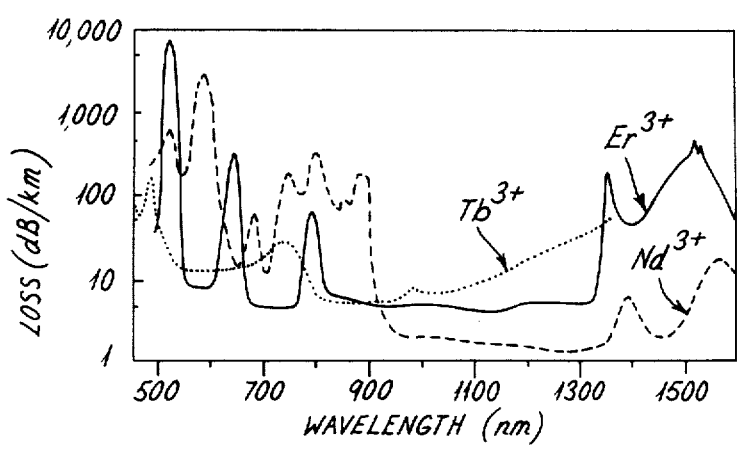

Other rare earth or transition metal dopants can be incorporated in fibre using the technique described, using the appropriate halide dopant precursor. These also exhibit high absorption bands at practical pump wavelengths and low-loss windows at useful emission wavelengths. This is illustrated for the rare-earths erbium ($Er^{3+}$) and terbium ($Tb^{3+}$) in FIG. 5.

Figure 6:
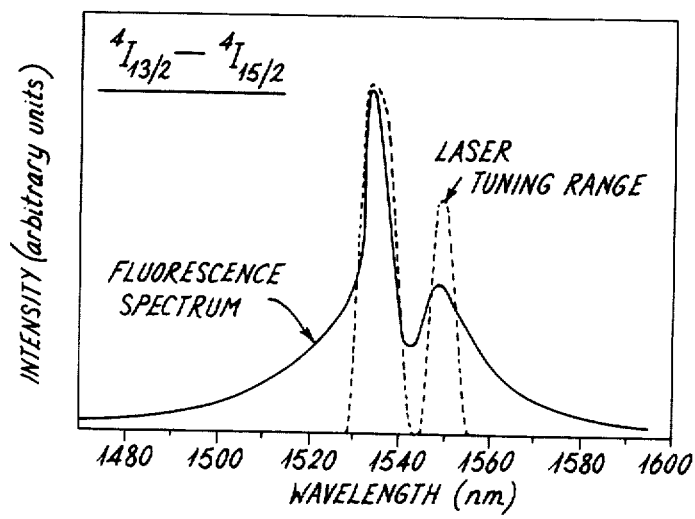
Figure 7:
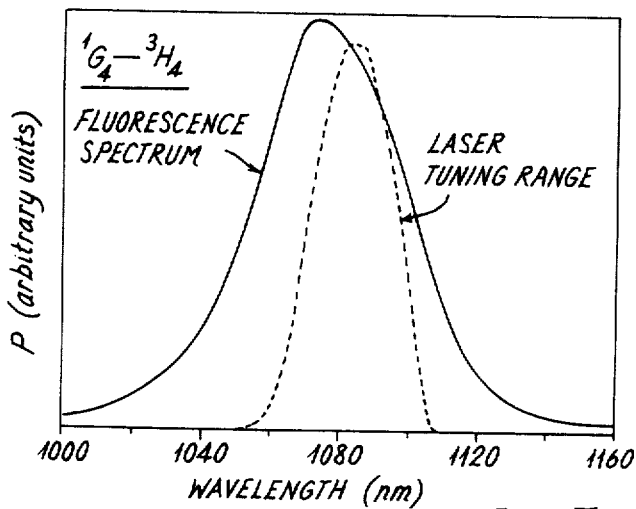

A similar arrangement to that of FIG. 4 has been tested for erbium-doped fibre. The fibre 1 was 90 cm length with an unsaturated absorption of 10dB/m at 514 nm. This was abutted to an input dielectric mirror 7 ( R = 82% @ 1.54 pm; T = 77% @ 514 nm). The diffraction grating, also 600 lines/mm, was blazed at 1.6 μm. A full tuning range of 25 nm from 1.528 to 1.542 and from 1.544 to 1.555 μm was obtained at a pump power three times that of threshold (30 mW) (see FIG. 6). This thus spans much of the wavelength region of interest for long-haul fibre-optic communications. Praseodymium-doped fibres also afford tuning. Using a CW Rh6G dye laser at 590 nm and a 1 μm blazed grating a 61 nm tuning range 1048 nm – 1109 nm has been obtained. The threshold occurred at 10 mW absorbed power.

Figure 8:
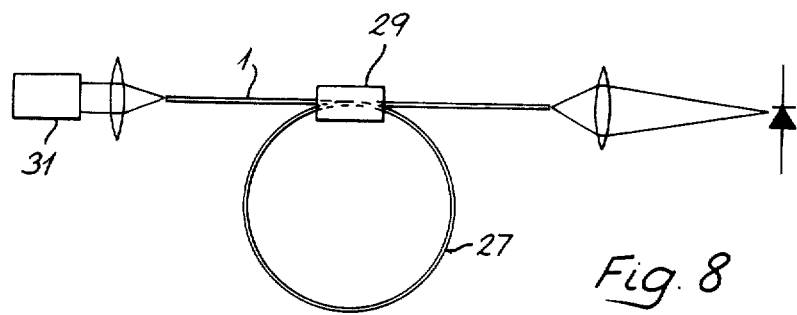

The long lengths of fibre 1 may be coiled to afford compact packaging. It is also possible to construct ring-cavity laser structures, an example of which is shown in FIG. 8. Here a fibre ring 27 (diameter 70 cm) was produced by splicing together two ports of a fused tapered-coupler 29 made from $Nd^{3+}$ doped fibre. The coupler 29 was designed so that more than 80% of the power of a dye-laser pump 31 at 595 nm was coupled into the ring 27, while at the lasing wavelength less than 10% per round trip was extracted. Coupler losses were measured to be 3 dB at 633 nw (fibre multi-mode), and 1 dB at 1 μm. The fibre used was as in the previous embodiment (FIG. 1), although the absorption at the dye-laser pump wavelength of 595 nm is considerably higher (30 dB/m). In this ring laser configuration the pump radiation should be largely absorbed within the ring 27 and not in the leads 1. It is therefore an advantage to construct the coupler 29 from one undoped and one doped fibre, such that the leads do not absorb at the pump wavelength.

Lasing threshold was observed at a dye-laser pump power of 80 mW, which, owing to coupler losses and lead absorption, corresponds to a few milliwatts absorbed in the ring. At the maximum dye-laser power of 280 mW, (estimated ring absorption 20 mW), the ring-laser output was 2 mW. Allowing for bi-directional ring-laser ouput, the slope efficiency is estimated to be approximately 20%.

Figure 9:
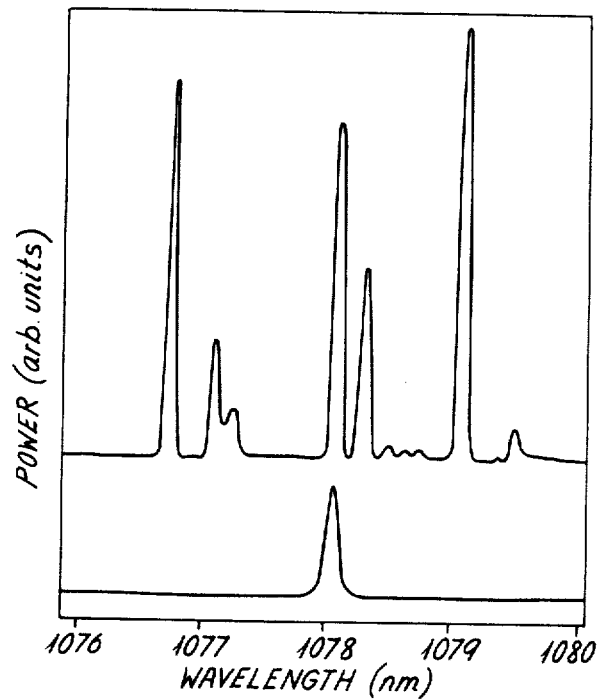

The lasing wavelength was centred at 1.078 μm with a full-width half maximum spectral-width of 4 nm (see FIG. 9). The shift of 10 nm from the linear configuration is due to a slight mismatch between the coupler wavelength response and the laser gain curve. It may thus be possible to tune the laser wavelength over the full gain curve (90 nm width) by varying the coupler characteristics.

Figure 10:
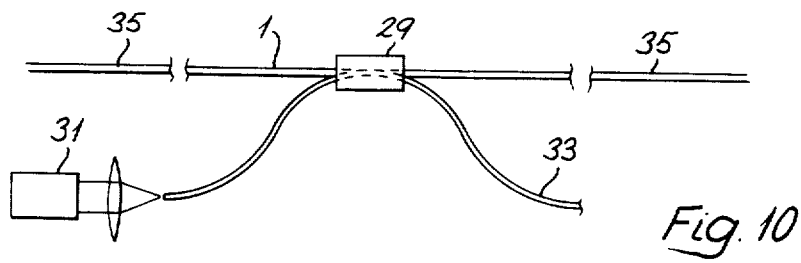

An amplifier arrangement is shown in FIG. 10. this is constructed using an open-ended 4-port coupler 29, 33 comprised of doped fibre 1. As shown this is inserted into a length of conventional transmission fibre 35. Signal at emission wavelength is propagated along the main fibre 1 which serves as gain medium. Pumping radiation from the source 31 is coupled to the coupling fibre 33 and thence into the main fibre 1.

Increased efficiency can be obtained using a coupler designed to couple the pumping radiation into fibre 1, but which does not couple at the emission wavelength. Moreover, it is an advantage that the lead 33 is of undoped fibre in order to ensure that the pump power is absorbed largely in the selection of amplifying fibre 1.

A single pass gain of 25 dB has been measured for a 3 m length of erbium-doped fibre (300 ppm $Er^{2+}$) using a similar arrangement. To prevent the onset of laser action, the optical feedback resulting from present reflections was reduced by index matching one end of the fibre. In practice, splicing the fibre into a fibre system would be sufficient to largely eliminate etalon effects, since low-reflectivity splices are readily achievable.

We claim:

1. A fibre-optic laser comprising:
   a resonant cavity including a length of silica glass optical fibre having a core and cladding, and incorporating active dopant ions in the core thereof; and,
   a diode laser optical pump source coupled to said resonant cavity to inject continuous optical pumping radiation to propagate along said resonant cavity to stimulate continuous wave mode emission therefrom, wherein
   the fibre is of a length of at least 5 cm, and of single-mode geometry and is of a type capable of sustaining single transverse mode propagation at emission wavelength; and,
   the active dopant ions, ions of a rare-earth or a transition metal, are incorporated in the fibre at a low-level uniform concentration (<900 ppm) the fibre providing an untra-low loss (<40dB/km) holst therefor.

2. A laser as claimed in claim 1, the resonant cavity including first and second mirror means located at opposite ends of the fibre.

3. A laser as claimed in claim 1 wherein the active dopant ions in the core are of materials which have physical properties such that the stimulated emission corresponds to a three-level optical transition for said ions.

4. A device, as claimed in claim 3 wherein the dopant ions are of erbium.

5. A fibre-optic ring-cavity laser comprising:
- an optical pump source to inject continuous optical pumping radiation; and
- a four-port coupler having first, second, third and fourth ports, said first port being connected to said optical pump source, said coupler further comprising a first silica glass optical fibre extending between said first and second ports, and a second silica glass optical fibre incorporating said third and fourth ports and being configured as a closed ring;
- said second silica glass optical fibre having a core and cladding and incorporating active dopant-ions in and throughout said core;
  - wherein the second silica glass optical fibre, which is of a length of at least 5 cm, is of single-mode geometry and is capable of sustaining single transverse mode propagation at its emission wavelength; and
  - the active dopant ions, ions of a rare-earth or a transition metal, are incorporated in the second silica glass optical fibre at a low-level uniform concentration (<900 ppm), the second silica glass optical fibre providing an ultra-low loss (<40 dB/km) host therefor.

6. A fibre-optic amplifier comprising:
- a length of single-mode transmission silica glass optical fibre;
- a four port optical coupler having a length of silica glass optical fibre having a core and cladding incorporating active dopant ions in the core thereof, which length of silica glass optical fibre is inserted in and spliced to the length of single-mode transmission silica glass optical fibre; and
- a diode laser optical pump source coupled to one free port of the four-port optical coupler to inject continuous optical pumping radiation to propagate along said length of silica glass optical fibre to stimulate continuous wave mode emission therefrom and therby amplify transmission signal input to the transmission fibre, wherein the silica glass optical fibre, which is of a length of at least 5 cm, is of single-mode geometry and is capable of sustaining single transverse mode propagation at its emission wavelength; and
- the silica dopant ions, ions of a rare-earth or a transition metal, are incorporated in the cladded glass fibre at a low-level uniform concentration (<900 ppm) the silica glass optical fibre providing an ultra-low loss (<40dB/km) host therefor.

* * * * *

UNITED STATES PATENT AND TRADEMARK OFFICE
CERTIFICATE OF CORRECTION

PATENT NO : 4,955,025
DATED : September 4, 1990
INVENTOR(S): R.J. Mears et al.

It is certified that error appears in the above-identified patent and that said Letters Patent is hereby corrected as shown below:

On title page, item [30] "Foreign Application Priority Data" add the following priority information --Aug. 13, 1986 [GB]  PCT PCT/GB86/00485 --

Signed and Sealed this

Twentieth Day of May, 1997

Attest:

BRUCE LEHMAN

Attesting Officer   Commissioner of Patents and Trademarks